Patented Sept. 13, 1949

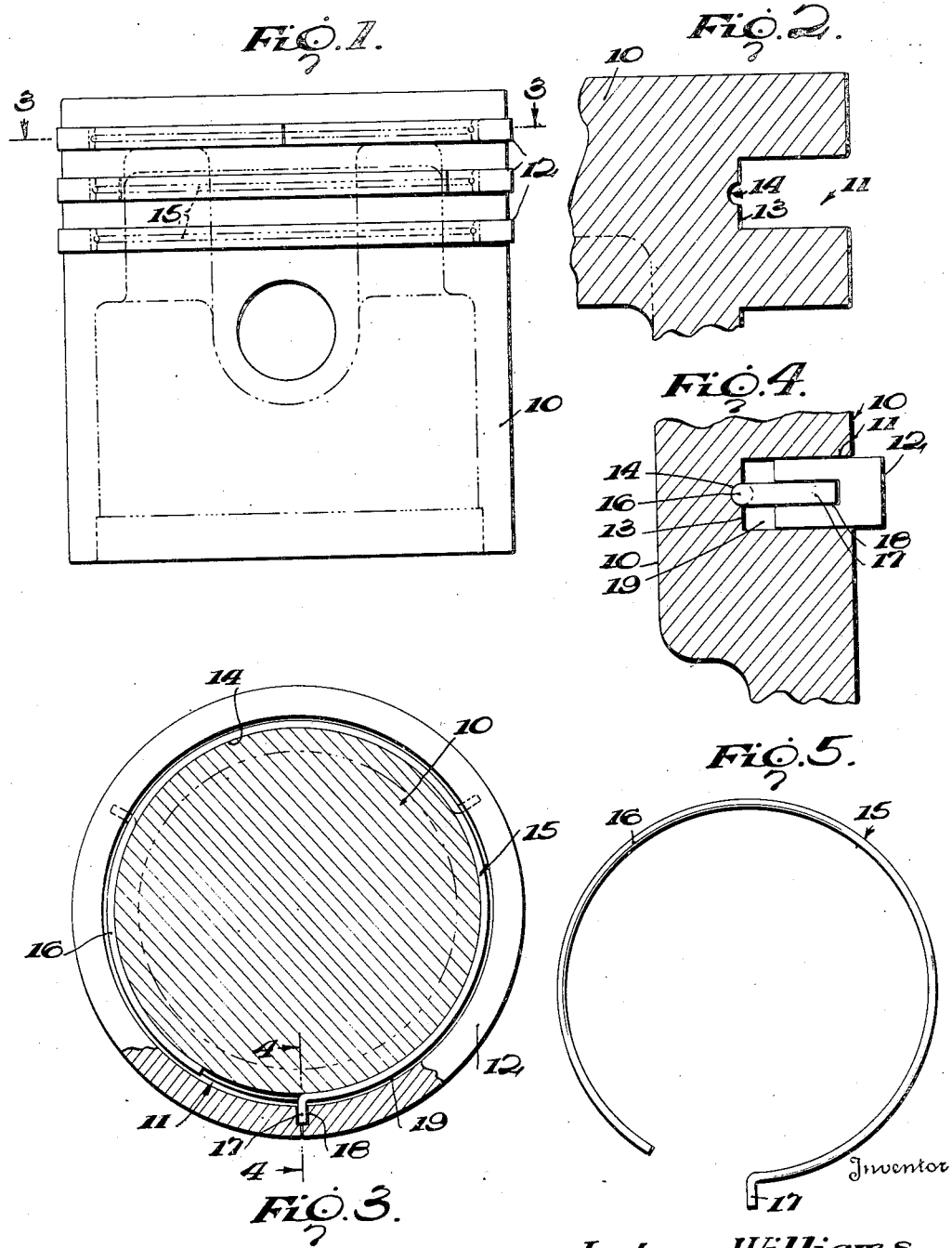

2,481,552

UNITED STATES PATENT OFFICE 2,481,552

PISTON AND LOCKED RING ASSEMBLY AND PISTON RING LOCKING CLIP

Judson Williams, Ben Salem, Pa.

Application November 19, 1946, Serial No. 710,882

2 Claims. (Cl. 309—44)

1

This invention relates to an improved piston and locked ring assembly, and piston ring locking clip.

Heretofore, it has been widely customary to use a simple stop pin embedded in the bottom wall of the ring groove and adapted to project between the ends of the ring or into a suitable socket therein for locking the ring against rotation. The construction has the advantage that the pin blocks the groove in minimum degree, so that oil may freely flow radially of the groove as well as circumferentially thereof about the ring. However, the construction has the disadvantage that the pin, being rigidly installed, often becomes worn by the ring to such extent that, not infrequently after a more or less short period of use, the pin breaks off, necessitating an immediate, tedious, and expensive repair job.

The present invention therefore has as its objects to provide an assembly which, by employing a stop pin, will retain the advantages of such a pin, wherein the pin will be, in some degree, yieldably mounted so that pounding of the ends of the ring against the pin will be cushioned somewhat to obviate premature wear of the pin, wherein the pin will be sustained in the groove by a segmental, annular body member countersunk in the bottom wall of the groove so as not to appreciably obstruct the space between the inner periphery of the ring and said wall to block the free flow of oil therein, and wherein said pin and body member will be formed as a unit to provide a resilient clip which may be readily applied to the piston, gripped thereon, and as easily removed.

Other and incidental objects will appear during the course of the following description of the invention, and in the drawings:

Figure 1 is an elevation of a piston embodying my invention.

Figure 2 is a fragmentary vertical section showing a typical channel in one of the ring grooves of the piston.

Figure 3 is a horizontal section on the line 3—3 of Figure 1.

Figure 4 is a fragmentary vertical section on the line 4—4 of Figure 3.

Figure 5 is a detail plan view of the locking clip employed.

Referring now more particularly to the drawings, I have shown an internal combustion engine piston 10 provided with ring grooves 11 in which fit resilient piston rings 12. The number of ring grooves and rings is immaterial. In the present instance, I have shown the rings as provided with square ends to form a butt joint therebetween. This detail is also immaterial, as a scarf, or other joint could well be employed between the ends of the rings. As is usual, the rings are adapted to expand against the wall of the cylinder in which the piston is installed and thereby form a working seal between piston and cylinder. However, a handicap lies in the fact that the rings, while an engine is in operation, tend to rotatively creep, with the result that the joints of the several rings become aligned to permit leakage of compression.

The bottom walls of the ring grooves 11 are indicated at 13, and, in the present instance, I form in each of said walls an annular channel 14 completely encircling the piston. As more particularly brought out in Figure 2 of the drawings, the channel 14 is disclosed as located midway of the bottom wall 13 of each groove. However, the detail is not particularly important, as the channel could well be located near either the top wall or the bottom wall of said groove.

In conjunction with each of the rings 12 I provide a locking clip 15 therefor, shown in detail in Figure 5 of the drawings. The clip is preferably formed from a length of suitable resilient wire and comprises a segmental, annular body member 16 from one end of which projects an integral radial stop pin 17. The body member 16 is of a diameter to resiliently and more or less tightly grip the piston 10 within any one of the channels 14 and may, within limits, be varied in length, but, in any event, is preferably greater in extent than a semi-circle so as to effectively grip the piston.

In use, the body member 16 of the clip 15 is flexed to embrace the piston 10 within any one of the grooves 11, when said body member is seated in the channel 14 of said groove to resiliently grip the piston. The clip may thus be readily applied, and as easily removed. As brought out in Figure 3, the stop pin 17 will thus be supported to extend radially of the ring groove, and formed in the ends of each of the rings 12, preferably from the inner periphery thereof, is a socket 18 snugly accommodating said pin. However, in any instance where the ends of a conventional ring do not meet and sufficient space therebetween is present to receive the pin 17, the socket 18 will not be necessary.

As will be appreciated from the foregoing, the extent of the tight, frictional contact between the body member 16 of each of the clips 15 and the piston will be adequately sufficient to secure the clip against rotation within the channel 14. Thus, the pins 17 of the clips will be supported to lock the several rings 12 against rotative creeping movement. However, attention is directed to the fact that, since the wire of the clips is resilient, a yieldable connection between each of the pins and its body member 16 is provided. Thus, the pins will be sustained to yield somewhat to the end thrust of the rings 12 and so cushion in some degree any pounding of the ends of the rings against the pins. Premature wear of the pins is thus avoided. This feature is of importance, as it has been found that a rigidly mounted pin will wear and break off much sooner than a yieldably mounted pin, as in the present instance.

It is now to be noted that the usual space 19 is provided behind each of the rings 12 between the inner periphery of the ring and the bottom wall 13 of its ring groove 11. This space provides clearance, so that the ring will, as the piston reciprocates, be free to yieldably maintain contact with the cylinder wall. As is well known, the space 19 also provides an annular oil duct behind the ring, which duct is of importance in the distribution of oil within the ring groove about the piston ring therein. It is accordingly of importance, also, to obstruct the space 19 as little as possible.

As particularly shown in Figure 3, the body member 16 of each of the clips 15 is countersunk in its channel 14 so that said body member does not block the corresponding clearance space 19, while the pin 17 of said clip offers no more obstruction than conventional pins fixed in the bottom walls of the ring grooves. The construction is of decided practical advantage over any device fitting in the ring groove to engage the top and bottom walls thereof as, in the present instance, oil may freely flow in the space 19 behind the ring and so distribute freely around the circumference of the ring. Furthermore, free expansion and contraction of the ring, as the piston reciprocates, will not be blocked at any point in the ring groove.

Having thus described my invention, I claim:

1. In an assembly of the character described, the combination of a piston having a ring groove, a piston ring disposed in said groove to define a circular clearance space between the inner periphery of the ring and the bottom wall of said groove, a split annular body member gripping the piston at the bottom of said groove for frictionally locking said member against rotation on the piston, said member being partially disposed out of said clearance space, and a radial stop pin extending from one end of said body member across said clearance space to engage said ring and lock it against creeping movement, said pin embodying the sole part crossing said space to retard the flow of oil circumferentially therein.

2. In an assembly of the character described, the combination of a piston having a ring groove and provided in the bottom wall of said groove with a circumferential channel, a piston ring disposed in said groove and defining a circular clearance space between the inner periphery of said ring and the bottom wall of said groove, and a resilient locking clip having a split annular body member seated in said channel and provided at one end with a radial stop pin extending across said clearance space to engage the piston ring and lock it against creeping movement, said body member being in gripping contact throughout its length with the wall of said channel for the major portion of the circumference of the latter frictionally locking the clip against movement circumferentially of the piston and being countersunk in said channel to support said pin as the sole part crossing said clearance space to retard the flow of oil circumferentially therein.

JUDSON WILLIAMS.

REFERENCES CITED

The following references are of record in the file of this patent:

UNITED STATES PATENTS

| Number | Name | Date |
|---|---|---|
| 1,626,750 | Panyard | May 3, 1927 |
| 2,085,457 | Westerhouse | June 29, 1937 |
| 2,117,986 | Robertson | May 17, 1938 |
| 2,140,304 | Wishart | Dec. 13, 1938 |
| 2,182,851 | Muchnic | Dec. 12, 1939 |
| 2,300,518 | Phillips | Nov. 3, 1942 |

FOREIGN PATENTS

| Number | Country | Date |
|---|---|---|
| 16,178 | Great Britain | May 13, 1909 |